United States Patent Office 3,462,374
Patented Aug. 19, 1969

3,462,374
METHOD OF PREPARING CONCENTRATED
SILICA SOLS
Eugene J. Klosak, Chicago, Ill., assignor to Nalco
Chemical Company, Chicago, Ill., a corporation of
Delaware
No Drawing. Filed Apr. 4, 1966, Ser. No. 539,730
Int. Cl. B01j 13/00
U.S. Cl. 252—313                                    5 Claims

ABSTRACT OF THE DISCLOSURE

A process for producing concentrated and stable silica sols in which a silicic acid sol is added to an aqueous alkaline solution while heating said solution. The pH of the reaction mixture should be maintained within a range of from 8 to about 12 throughout the process. The heat evaporation under a pressure of 5–100 p.s.i.g. and silicic acid sol addition are continued until the alkaline solution comprises a silicic sol containing from 45 to 55% by weight of colloidally suspended silica particles. The process provides a simplified means for directly producing concentrated silica sols.

---

The present invention relates to a method of preparing aqueous silica sols. More specifically, the subject invention is directed to a process of making highly-concentrated silica sols.

Aqueous colloidal silica sols have been known for a number of years and have been the subject of extensive scientific investigation. These sols usually are prepared by removing a small portion of the alkali metal present in water glass (sodium silicate) to produce a colloidal system of what has been described as polymeric silicic acid sol. These silicic acid sols are relatively unstable due to high surface area and low average particle diameter below 5 millimicrons. To produce silica sols of long-term stability and relatively high solids content, it is necessary to further process the silicic acid sols by concentration methods which includes "growing" the silica particles to a particle diameter which generally ranges between 15 and 150 millimicrons.

One method of forming silicic acid sols involves neutralizing a sodium silicate solution with a mineral acid. The salts formed in the neutralization reaction are then removed by such means as dialysis, electro-dialysis, electro-osmosis, etc. One of the best methods for conveniently preparing silicic acid sols is described in Bird Patent No. 2,224,325. In this process an alkaline metal silicate solution is passed through an ion exchange material which removes most of the sodium ions and thereby forms silicic acid. However, as in many prior art methods of preparing silicic acid sols, the sols are only produced as relatively dilute solutions, and as well, will gel in a few hours. For example, in the Bird Patent, it is suggested that sols may be concentrated by evaporation only to a silica content of about 15%. Attempts to concentrate to higher solids content results in gelation. The disadvantages of shipping, storing and applying such a relatively low concentrated silica sol are apparent.

Thus, efforts have been directed toward both concentrated silicic acid sols and simultaneously stabilizing them. One method of concentrating silica sols to a silica content of about 35% is disclosed by Bechtold et al. in U.S. Patent No. 2,574,902. Other methods are disclosed by Rule in U.S. Patents 2,577,484 and 2,577,485. While the above-discussed methods are useful in preparing stable sols having silica concentrations of up to about 35 to 40%, they are not entirely satisfactory for use in forming more concentrated sols. Additionally, certain of the above methods include expensive and time-consuming process steps which are not satisfactory in plant scale operations.

To date, no method has been devised for directly processing silicic acid sols without resort to ancillary steps to produce aqueous silica sols that are both highly concentrated and stable. It would be a substantial advance in the silica sol art if such a method were known.

It therefore becomes an object of the invention to provide a method of producing aqueous silica sols that are highly concentrated and also possess the property of long-term standing.

A specific object of the invention is to directly process silicic acid sols in a one-step procedure to produce stable aqueous silica sols having a solids content ranging between 45 and 55%.

Other objects will become apparent to those skilled in the art from the following detailed description of the invention.

In general, the subject invention comprises the discovery that stable and highly concentrated silica sols may be prepared by simply processing silicic acid sols in a one-step procedure involving no prior treatment of the acid sol or subsequent treatment of the resultant silica sol. The invention broadly comprises preparing an alkaline aqueous solution which is heat evaporated under a pressure of 5–100 p.s.i.g. During the evaporation, a silicic acid sol is simultaneously added to the alkaline solution. The heat evaporation and silicic acid sol addition are continued until the alkaline solution comprises a silica sol containing 45–55% by weight of colloidally suspended silica particles, expressed as $SiO_2$. The resultant silica sol in the reaction vessel has been found to be almost permanently stable, with the silica particles having no tendency to agglomerate or aggregate into gel particles.

More specifically, in the practice of the invention, water which has been alkalyzed to a pH range from about 10 to about 12 is added to a reaction vessel. The alkali material may be chosen from a wide variety of known basic substances, such as sodium hydroxide, potassium hydroxide, lithium hydroxide, etc. In a preferred embodiment, sodium silicate is employed as an alkalyzing medium. Use of alkali metal silicate has the dual purpose of adjusting the pH of the starting aqueous solution to the desired basic range, and as well, is a convenient source of additional silica during the production of silica sols. Most preferably, the starting aqueous solution contains 0.5–3.0% by weight of an alkali metal silicate, such as sodium silicate, expressed as $SiO_2$.

Pressure is then placed upon the starting alkaline aqueous solution. Broadly, the pressure may vary from 5 to about 100 p.s.i.g. but it is greatly preferred that the pressure during reaction be maintained within the range of 5–20 p.s.i.g. and most preferably 8–15 p.s.i.g. The alkaline reaction mass is then heated under the above-stated pressures to boiling to evaporate water therefrom while a source of silicic acid sol is simultaneously added thereto. The temperature of the reaction will, of course, be dependent upon the pressure applied. Generally, the process is run at a temperature of 230° to about 340° F. and more preferably 230° to 260° F. In the most preferred embodiment, the temperature ranges from about 235° to about 250° F.

It is important during the whole of the process to maintain the pH of the reaction vessel within rather definite limits. Particularly, the aqueous alkaline solution should be maintained within a basic pH range of 8.0 to about 12.0. Generally, if the starting alkaline aqueous solution is sufficiently basic, say within the range of 10–12, no additional basic material need be added during the process. However, if necessary, additional base can be added to the reaction vessel.

In another preferred embodiment of the invention, addition of the silicic acid sol is so adjusted so as to maintain a substantially constant volume of alkaline solution during evaporation. However, this is not absolutely essential. The silicic acid sol may be added in a continuous manner, or by a method of slug feeding, or by a combination of these expedients. It is greatly preferred that near the end of the reaction, say when the silica content reaches 35%, the silicic acid is fed in a continuous slow manner.

The silicic acid sol added to the reaction vessel may be produced by a wide variety of methods. Most preferably, the acid sol is prepared via the process outlined in the above-cited Bird Patent. All of the additive acid sols have average molecular weights below about 90,000. More preferably, these acid sols contain silica particles having an average molecular weight of from 1,000 to 46,000. The pH of these acid sols is below 5.5 and more preferably they lie within the range of 2.5 and 3.5. The average particle diameter is less than 5 millimicrons and generally 1–4 millimicrons. The starting silicic acid sols grown and concentrated by the method of the invention generally have an $SiO_2$ solids content ranging from about 3% to about 10% and more preferably 5%–10%.

As mentioned above, any silicic acid sol falling within the above-stated product definition may be utilized in the invention. For example, a suitable silicic acid sol may be prepared by a variation of the Bird method described above. In this embodiment, the effluent in the Bird process is then further treated by passing it through a weak base resin in the free base form. The resultant product is then substantially stripped of any ions and is generally described as "deionized." Still another variation of the Bird technique is to employ a mixed resin bed, that is, a bed containing weak base resin in the free base form and a strong acid resin in the hydrogen form whereby the silicic acid sol is formed simultaneously with exchange of its companion ions to produce a substantially deionized polysilicic acid sol.

The above-described methods are preferred to produce the starting acid sol. However, it must be understood that any appropriate acid silica sol of requisite molecular weight and pH may also be used.

Depending upon a variety of variables such as pressure, temperature, size of reaction, etc., the time necessary to produce the desired stable concentrated silica sol may greatly vary. Generally, however, reaction is complete in commercial runs in a time ranging from about 6 to about 30 hours and more often 8 to 24 hours.

At the completion of the reaction, a suitable stable concentrated aqueous silica sol is achieved which need not be further processed in any manner and may be directly utilized without further steps. These sols, which are almost permanently stable, contain 45–55% by weight of silica, expressed as $SiO_2$, and more preferably 49–55% by weight. The resultant silica sols have an average particle size diameter ranging from about 15 to about 150 millimicrons, and more often fall within the range of 15–35 millimicrons. The molecular weight of the silica particles is in excess of 200,000 and may range as high as several million. The product sols contain discrete silica particles having an $SiO_2:Na_2O$ ratio of between about 150:1 to 350:1 and preferably from 200:1 to 250:1. The final product usually has a pH of 8.5–9.5 and a specific conductance greater than $4 \times 10^{-4}$ m.h.o./cm. at 28° C. and 10% $SiO_2$.

It is believed that the above-described process is the first method of directly concentrating silicic acid sols to produce stable aqueous silica sols having solids content falling within the 45–55% range. As is clearly evident, the silicic acid sol is directly processed without pretreatment via a highly economical procedure. Heretofore, such direct silicic acid sol processing has been unknown. Moreover, the sol product was found to be highly stable, even within the above-stated concentration range.

The following example will serve to more fully illustrate the invention.

Example I

To a reaction vessel was added 1,100 gallons of water and 47 gallons of a sodium silicate aqueous solution containing approximately 28% by weight of silica, expressed as $SiO_2$. A pressure of 15 p.s.i.g. was placed on the vessel and the alkaline solution heated to boiling which occurred approximately at a temperature of 250° F. The starting pH of the alkaline solution was 11.0. To the pressurized boiling solution was added a silicic acid sol having an approximate silica content of 7%, expressed as $SiO_2$. The alkaline solution was evaporated under the above pressure and at the above temperature for approximately 17½ hours. During this time solution volume was maintained constant by feeding in acid sol intermittently. The final product had a pH of 9.0 and was a silica sol of long-term stability containing about 50% by weight of silica, expressed as $SiO_2$. The silica particles had an average particle diameter size within the range of 20–25 millimicrons.

Obviously many modifications and variations of the invention as herein set forth may be made without departing from the spirit and scope thereof, and therefore only such limitations should be imposed as are indicated in the appended claims.

The invention is hereby claimed as follows:

1. A process for preparing a stable concentrated silica sol, which comprises: preparing an alkaline aqueous solution, said alkaline aqueous solution being sodium silicate, sodium hydroxide, potassium hydroxide, or lithium hydroxide dissolved in water, heat evaporating said solution under a pressure of 5–100 p.s.i.g. while simultaneously adding thereto a silicic acid sol containing $SiO_2$ particles having an average particle diameter less than 5 millimicron, and continuing said process until said aqueous solution comprises a silica sol containing 45–55% by weight of colloidally and stably suspended discrete silica particles, expressed as $SiO_2$, said particles having average particle diameters of 15–150 millimicrons, the pH of said alkaline solution being maintained within a range of from 8 to 12 throughout said process.

2. The process of claim 1 wherein said initially prepared alkaline solution is 0.5–3.0% by weight of sodium silicate, expressed as $SiO_2$, dissolved in water.

3. The process of claim 1 wherein the volume of said alkaline solution during evaporation is kept substantially constant by appropriate addition of silicic acid sol.

4. The process of claim 1 wherein said silicic acid sol contains 3–10% by weight of silica, expressed as $SiO_2$.

5. The process of claim 4 wherein said process time ranges from about 6 to about 30 hours.

References Cited

UNITED STATES PATENTS 2,574,902  11/1951  Bechtold et al. _____ 252—313
3,128,251  4/1964  Reven et al. _____ 252—313

RICHARD D. LOVERING, Primary Examiner